(12) United States Patent
Hoffmann et al.

(10) Patent No.: US 11,069,018 B2
(45) Date of Patent: Jul. 20, 2021

(54) SYSTEMS, METHODS AND MACHINE READABLE PROGRAMS FOR VALUE CHAIN ANALYTICS

(71) Applicant: Refinitiv US Organization LLC, New York, NY (US)

(72) Inventors: Hella-Franziska Hoffmann, London (GB); Daniella Tsar, Orpington (GB); Tharindi Hapuarachchi, London (GB)

(73) Assignee: Refinitiv US Organization LLC, New York, NY (US)

( * ) Notice: Subject to any disclaimer, the term of this patent is extended or adjusted under 35 U.S.C. 154(b) by 163 days.

(21) Appl. No.: 15/944,904

(22) Filed: Apr. 4, 2018

(65) Prior Publication Data
US 2018/0293685 A1 Oct. 11, 2018

Related U.S. Application Data

(60) Provisional application No. 62/481,737, filed on Apr. 5, 2017.

(51) Int. Cl.
*G06Q 50/28* (2012.01)
*G06Q 30/02* (2012.01)
(52) U.S. Cl.
CPC ......... *G06Q 50/28* (2013.01); *G06Q 30/0201* (2013.01)
(58) Field of Classification Search
CPC .................................................. G06Q 50/28
See application file for complete search history.

(56) References Cited

U.S. PATENT DOCUMENTS

| 2008/0288889 A1* | 11/2008 | Hunt | G06Q 30/02 715/810 |
| 2009/0018996 A1* | 1/2009 | Hunt | G06F 16/283 |
| 2010/0138279 A1* | 6/2010 | Cohen | G06Q 10/0639 705/7.38 |

(Continued)

FOREIGN PATENT DOCUMENTS

WO 2018005665 A1 1/2018

OTHER PUBLICATIONS

E. W. Dijkstra. "A Note on Two Problems in Connexion with Graphs." Numerische Mathematik 1, 269-271 (1959).

(Continued)

*Primary Examiner* — Kurtis Gills
(74) *Attorney, Agent, or Firm* — Winthrop & Weinstine, P.A.

(57) ABSTRACT

In accordance with one aspect, the present disclosure is directed to of determining relative importance of a plurality of entities in a supply chain of a company. One way of doing this is identifying for the company, the plurality of entities in the supply chain, and determining the relative importance of each of the plurality of entities within the supply chain. The relative importance is determined via at least one processor circuit programmed to determine, for each respective entity in the supply chain, a relative buying power, a supplier revenue fraction, and an industry revenue exposure. The processor circuit is programmed to compute a relative importance score for each respective entity in the supply chain, as a function of the determined buying power, supplier fraction, and industry revenue exposure for the respective entity.

19 Claims, 9 Drawing Sheets

(56) References Cited

U.S. PATENT DOCUMENTS

| | | | |
|---|---|---|---|
| 2012/0239456 A1* | 9/2012 | Jones | G06Q 10/08 705/7.31 |
| 2012/0271837 A1 | 10/2012 | Kryger et al. | |
| 2013/0041713 A1 | 2/2013 | Henrich et al. | |
| 2013/0041714 A1 | 2/2013 | Henrich et al. | |
| 2013/0253978 A1 | 9/2013 | Adachi et al. | |
| 2013/0254303 A1 | 9/2013 | Cheng et al. | |
| 2014/0019471 A1* | 1/2014 | Linton | G06N 5/02 707/759 |
| 2014/0188935 A1 | 7/2014 | Vee et al. | |
| 2014/0278706 A1* | 9/2014 | Leidner | G06Q 10/06315 705/7.25 |
| 2014/0278728 A1 | 9/2014 | Hollenbach et al. | |
| 2014/0280360 A1 | 9/2014 | Webber et al. | |
| 2015/0046363 A1* | 2/2015 | McNamara | G06Q 10/0635 705/333 |
| 2016/0117413 A1 | 4/2016 | Botea et al. | |
| 2017/0024827 A1* | 1/2017 | McGill | G06Q 40/08 |
| 2018/0004822 A1 | 1/2018 | Mulder et al. | |

OTHER PUBLICATIONS

USPTO. International Search Report for PCT Application No. PCT/US2017/039792, 1 pg. (dated Sep. 15, 2017).

IP Australia. Examination Report dated Apr. 10, 2019, for related Australian Patent Application No. 2018202359, 6 pages.

IP Australia. Examination Report dated Sep. 3, 2019, for related Australian Patent Application No. 2018202359.

IP Australia. Examination Report dated Apr. 3, 2020, for related Australian Patent Application No. 2018202359.

\* cited by examiner

| common_name | permid | industry(TRBC2) | country | rel_confidence | ind_rev_exp | capex_score | suppl_rank_fract | score |
|---|---|---|---|---|---|---|---|---|
| Ball Corp | 4.295904e+09 | Containers & Packaging | US | 0.31 | 0.520200 | 1.122222 | 1.000000 | 0.583780 |
| Crown Holdings Inc | 4.295904e+09 | Containers & Packaging | US | 0.31 | 0.520200 | 0.875926 | 1.000000 | 0.455857 |
| Daimler AG | 4.295870e+09 | Automobiles & Auto Parts | DE | 0.31 | 0.338713 | 1.304414 | 1.000000 | 0.441822 |
| Airbus SAS | 4.297548e+09 | Aerospace & Defense | FR | 0.67 | 0.271137 | 2.313528 | 0.555556 | 0.348491 |
| Rexam Ltd | 4.295895e+09 | Containers & Packaging | GB | 0.56 | 0.520200 | 1.122222 | 0.500000 | 0.291890 |
| Audi AG | 4.295869e+09 | Automobiles & Auto Parts | DE | 0.56 | 0.338713 | 0.750928 | 1.000000 | 0.254349 |
| Boeing Co | 4.295903e+09 | Aerospace & Defense | US | 0.64 | 0.271137 | 1.840141 | 0.400000 | 0.199572 |
| Peugeot SA | 4.295867e+09 | Automobiles & Auto Parts | FR | 0.31 | 0.338713 | 0.527791 | 1.000000 | 0.178770 |
| Bayerische Motoren Werke AG | 4.295889e+09 | Automobiles & Auto Parts | DE | 0.63 | 0.338713 | 0.859912 | 0.500000 | 0.145632 |

103 → ind_rev_exp  105 → capex_score  107 → suppl_rank_fract  109 → score

FIGURE 2B

VALUE CHAIN ANALYTICS
SCORING CUSTOMERS BY REVENUE GENERATION

| | Overall Score | Company | Industry Revenue Exposure | Capex Score | Competitive Supplier Fraction | Relationship Confidence |
|---|---|---|---|---|---|---|
| Supplier | 7.00 | Ball Corp | | | | |
| Industry | | | 0.520 | 1.122 | 1.00 | 0.31 |
| | 5.47 | Crown Holdings Inc | | | | |
| | | | 0.520 | 0.876 | 1.00 | 0.31 |
| | 5.18 | Airbus SAS | | | | |
| | | | 0.271 | 2.00 | 0.556 | 0.67 |
| | 4.83 | Daimler AG | | | | |
| | | | 0.339 | 1.30 | 1.00 | 0.31 |
| | 4.49 | Audi AG | | | | |
| | | | 0.339 | 0.751 | 1.00 | |
| | 3.44 | Boeing Co | | | | |
| | | | 0.271 | 1.84 | 0.40 | 0.560 |
| | 2.83 | Bayerische Motoren Werke AG | | | | |
| | | | 0.339 | | 0.500 | |
| | 2.50 | Rexam Ltd | | | | |
| | | | 0 | | 1.00 | |
| | 1.97 | Peugeot SA | | | | |
| | | | 0 | | 1.00 | |

(111) Boeing is a medium important customer (113) About 30% revenue exposed to Aerospace A good portion of revenue shared with competitors

FIGURE 2D

| common_name | comp_supplier_count | comp_supplier_names | suppl_up_permids | suppl_ranks | suppl_rank_values | suppl_rank_fract |
|---|---|---|---|---|---|---|
| Crown Holdings Inc | 1 | [Constellium NV] | [5039650639] | [0] | [1] | 1.000000 |
| Audi AG | 1 | [Constellium NV] | [5039650639] | [0] | [1] | 1.000000 |
| Daimler AG | 1 | [Constellium NV] | [5039650639] | [0] | [1] | 1.000000 |
| Boeing Co | 3 | [Arconic Inc, Constellium NV, Kaiser Aluminum ... | [5000003748, 5039650639, 4295904352] | [3, 0, 4] | [0.8, 1, 0.7] | 0.400000 |
| Airbus SAS | 2 | [Arconic Inc, Constellium NV] | [5000003748, 5039650639] | [3, 0] | [0.8, 1] | 0.555556 |
| Peugeot SA | 1 | [Constellium NV] | [5039650639] | [0] | [1] | 1.000000 |
| Ball Corp | 1 | [Constellium NV] | [5039650639] | [0] | [1] | 1.000000 |
| Bayerische Motoren Werke AG | 2 | [Constellium NV, Hindalco Industries Ltd] | [5039650639, 4295873625] | [0, 1] | [1, 1] | 0.500000 |
| Rexam Ltd | 2 | [Hindalco Industries Ltd, Constellium NV] | [4295873625, 5039650639] | [1, 0] | [1, 1] | 0.500000 |

| SegmentName | SegmentRevenue | SegmentRevPct |
|---|---|---|
| Automotive Structures & Industry | 1002000000 | 0.2086630 |
| Packaging & Automotive Rolled Products | 2498000000 | 0.5202000 |
| Aerospace & Transportation | 1302000000 | 0.2711370 |

FIGURE 2E

| segment | target_industry | importance | importance_score |
|---|---|---|---|
| Automotive Structures & Industry | Automobiles & Auto Parts | 1 | 1.00 |
| Packaging & Automotive Rolled Products | Containers & Packaging | 1 | 1.00 |
| Packaging & Automotive Rolled Products | Automobiles & Auto Parts | 3 | 0.25 |
| Aerospace & Transportation | Aerospace & Defense | 1 | 1.00 |

FIGURE 2F

| customer_industry | SegmentRevenuePct | ind_rev_exp |
|---|---|---|
| Containers & Packaging | 0.520200 | 0.520200 |
| Automobiles & Auto Parts | 0.728863 | 0.338713 |
| Aerospace & Defense | 0.271137 | 0.271137 |

FIGURE 2G

SYSTEMS, METHODS AND MACHINE READABLE PROGRAMS FOR VALUE CHAIN ANALYTICS

PRIORITY CLAIM

This application claims priority under 35 USC § 119 to U.S. provisional patent application Ser. No. 62/481,737 filed Apr. 5, 2017, entitled "VALUE CHAIN ANALYTICS." The entire contents of the aforementioned patent application are expressly incorporated by reference herein for any purpose whatsoever.

This application for letters patent discloses and describes various novel innovations and inventive aspects of value chain analysis technology (hereinafter "disclosure") and contains material that is subject to copyright, mask work, or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for identifying meaningful associations between elements associated with entities in a database, and more particularly, include analytical methods for determining a relative importance of entities in a supply chain. However, in order to develop a reader's understanding of the innovations, descriptions have been compiled into a single disclosure to illustrate and clarify how aspects of these innovations operate independently, interoperate as between individual innovations, or cooperate collectively. The application goes on to further describe the interrelations and synergies as between the various innovations; all of which is to further comply with 35 U.S.C. § 112.

BACKGROUND

Many products deliver news articles or news feeds to the user. Typically, this news is selected by a computer algorithm in order to be relevant to the user. One method of delivering relevant news is to select news documents that mention companies in the user's portfolio or "watch list". Often, news articles will impact a company or an industry without explicitly mentioning the company. The presently disclosed embodiments provide solutions to these, and other problems in the art.

SUMMARY

Advantages of the present disclosure will be set forth in and become apparent from the description that follows. Additional advantages of the disclosure will be realized and attained by the methods and systems particularly pointed out in the written description and claims hereof, as well as from the appended drawings.

Many products (e.g. brokerage software, financial research software) deliver news articles, news feeds, or information to users. Typically, this news is selected by a computer algorithm in order to be relevant to the user. One method of delivering relevant news is to select news documents that mention companies in the user's portfolio or "watch list". However, news articles will often impact a company, or even a whole portfolio, without explicitly mentioning the company. For example, a story about the bankruptcy of GT Advanced Technologies (GTAT) may contain explicit mentions of only GTAT, and not any other company. But, such an article could be highly relevant to Apple Inc., who has significant supply chain relations with GTAT. As another illustration, news of Delta airlines cancelling an order for 18 Boeing 787 Dreamliner aircrafts, without explicitly mentioning any other companies aside from Delta and Boeing, can greatly impact companies which provide materials to Boeing for the construction of such aircrafts (such as, for example, an aluminum manufacturer).

In one aspect, the presently disclosed implementations link a range of valuable data from a supply chain of a company that can be useful for a range of users. One such example is the role of a portfolio manager, who is interested in understanding the risk profile of her/his investments. Assuming that the portfolio manager were armed with sufficient information to analyze the supply chain of a target company (such as Boeing, for example) in a relational database, the only information that would be provided would be an identification of hundreds of companies that might be linked with the Boeing, without reflecting relative importance of those relationships. This means that users (e.g., the portfolio manager in the above example) find it difficult to understand which of those relationships are more important or influential, and therefore determine the risk exposure of Boeing's supply chain. Many portfolio managers still solely rely on their intuition, experience and/or detailed analytics reports to make such determinations.

Examples of the present disclosure allow users to determine, using at least one database structured to recognize relations between various companies, how much of a company's revenue may be exposed to each of the customers and/or suppliers within the company's supply chain. In accordance with one aspect, the present disclosure is directed to determining relative importance of a plurality of entities in a supply chain of a company. One way of determining the relative importance of each of the entities, is by identifying for the company, a plurality of entities in the supply chain, and determining the relative importance of each of the plurality of entities within the supply chain via at least one processor circuit. Each of the plurality of entities in the supply chain may be a customer of the company or a supplier of goods or services to the company. In such example, the processor circuit is programmed to determine for each respective entity in the supply chain: a relative buying power of the entity as compared to other entities in a same industry as the respective entity, a supplier revenue fraction of the entity as compared to competitors to the respective entity, and an industry revenue exposure for the entity as compared to other industry segments to which the entity is exposed. The at least one processor circuit is further programmed to compute the relative importance score for each respective entity in the supply chain, as a function of the determined buying power, supplier fraction, and industry revenue exposure for the respective entity. In some implementations, each of the plurality of entities in the supply chain are a customer of the company or a supplier of goods or services to the company, which are written to at least one database structured to recognize relations between the entities and the company. In some implementations, the database is a graph database, and the method includes identifying connections between the company and a plurality of nodes in the graph database, wherein each respective node among the plurality of nodes are associated with an entity within the supply chain of the company.

In some example embodiments, at least one processor circuit is programmed to determine the relative buying power of the respective entity as a function of an operational expenditure for the entity relative to an industry average operational expenditure. The processor circuit may also be programmed to determine the relative buying power of the respective entity as a function of a research and development cost for the entity relative to an industry average research and development cost.

In some implementations, the computer-implemented method includes identifying, via at least one processor circuit and for each of the plurality of entities in the supply chain, a plurality of competitors for the entity, and an estimated revenue for the entity and each of the plurality of competitors. In such examples, the computer-implemented method includes calculating, via at least one processor circuit, the supplier revenue fraction for each respective entity as a function of the estimated revenue.

In some implementations, the disclosure provides an apparatus comprising a memory, a processor in communication with the memory, and configured to determine relative importance of entities in a supply chain of a company. In such examples, the processor executes instructions to retrieve from at least one database structured to recognize relations between the entities and the company, information regarding competitive suppliers of each of the plurality of entities, revenue information for each of the plurality of entities, and industry segment information for each of the plurality of entities. The processor also executes instructions to determine, for each respective entity in the supply chain and using the received database information, a relative buying power of the entity as compared to the competitive suppliers, a supplier revenue fraction of the entity as compared to the competitive suppliers, and an industry revenue exposure for the entity as compared to other industry segments to which the entity is exposed. The processor further executes instructions to compute a relative importance score for each respective entity in the supply chain, as a function of the determined buying power, supplier fraction, and industry revenue exposure for the respective entity.

In some implementations, the processor executes instructions to generate for display on a graphical user interface, a first display including a list of competitors of each of the plurality of entities in the supply chain, a second display including a list of the industries of each of the plurality of entities in the supply chain, and a third display including a supplier industry activity display including information on industry segments to which the entity is exposed. The processor may also execute instructions to generate for display on the graphical user interface, a fourth display including the relative importance score for each respective entity in the supply chain.

In some implementations, the processor executes instructions to receive as data input, a list of the entities, and to retrieve the competitive supplier information, revenue information, and industry segment information responsive to the received data input. The processor may execute instructions to retrieve from at least one database structured to recognize relations between the entities and the company, information regarding competitive suppliers of each of the plurality of entities, revenue information for each of the plurality of entities, and industry segment information for each of the plurality of entities. In some examples, the processor executes instructions to generate a display including the relative importance score for each respective entity in the supply chain, wherein each of the entities is color coded to illustrate a respective importance with regard to the other entities in the supply chain.

In some implementations, the disclosure provides a non-transitory machine readable medium storing instructions executable by a processor. The non-transitory machine readable medium may store instructions which, when executed by the processor, cause the processor to determine, for each respective entity in a supply chain of a company, a relative buying power of the entity as compared to other entities in a same industry as the respective entity, a supplier fraction of the entity as compared to competitors to the respective entity, and an industry revenue exposure for the entity as compared to other industry segments to which the entity is exposed. In some examples, the non-transitory machine readable medium may store instructions which, when executed by the processor, cause the processor to compute a relative importance score for each respective entity in the supply chain, as a function of the determined buying power, supplier fraction, and industry revenue exposure for the respective entity. In some examples, the non-transitory machine readable medium may store instructions which, when executed by the processor, cause the processor to identify for each respective entity, a plurality of industry segments served by the respective entity, identify a revenue for each of the plurality of industry segments served by the respective entity, and calculate the industry revenue exposure as a function of the identified revenue for each of the plurality of industry segments.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure:

FIG. 2A illustrates an example entity ranking in accordance with the disclosure.

FIG. 2B illustrates an example output including the relative importance of entities in a supply chain in accordance with the disclosure.

FIG. 2D illustrates an example competitive supplier view for a company, used to generate a relative importance of entities in a supply chain in accordance with the disclosure.

FIG. 2E illustrates an example screen shot diagram illustrating a further aspect of the embodiment of FIG. 2D.

FIG. 2F shows a further screen shot diagram illustrating a further aspect of the embodiment of FIG. 2D.

FIG. 2G shows a further screenshot diagram illustrating a further aspect of the embodiment of FIG. 2D

DETAILED DESCRIPTION

Reference will now be made in detail to the present preferred embodiments of the disclosure, examples of which are illustrated in the accompanying drawings. The methods and corresponding steps of the disclosed embodiments will be described in conjunction with the detailed description of the system.

In accordance with some implementations, the disclosure provides a computer-implemented method of quantifying the relationship between entities. In some implementations, this is accomplished by identifying multiple meaningful pathways connecting the entities within a database such as a graph database and/or a relational database. In some other implementations, the method can determine a relative importance score of entities within the database with regard to one another. In such a manner, the relative importance of entities within a supply chain of a company can be easily ascertained.

Various additional implementations of the disclosed tools and technological approaches herein can equivalently be applied to graph databases including social media data (e.g., Facebook®, LinkedIn®, and the like) to identify relationships between data nodes associated with people, companies, technologies, world events, and the like. Such tools can be used for scientific research, social science studies, and many other fields, wherein finance is only one of many implementations. Accordingly, the presently disclosed embodiments provide a new and unique research tool to leverage so-called "big data" in relevant and useful ways to provide a concrete and tangible end product by transforming inputs identifying two entities in a graph database into useful outputs that identify the various ways in which those entities are connected.

Figure 1:
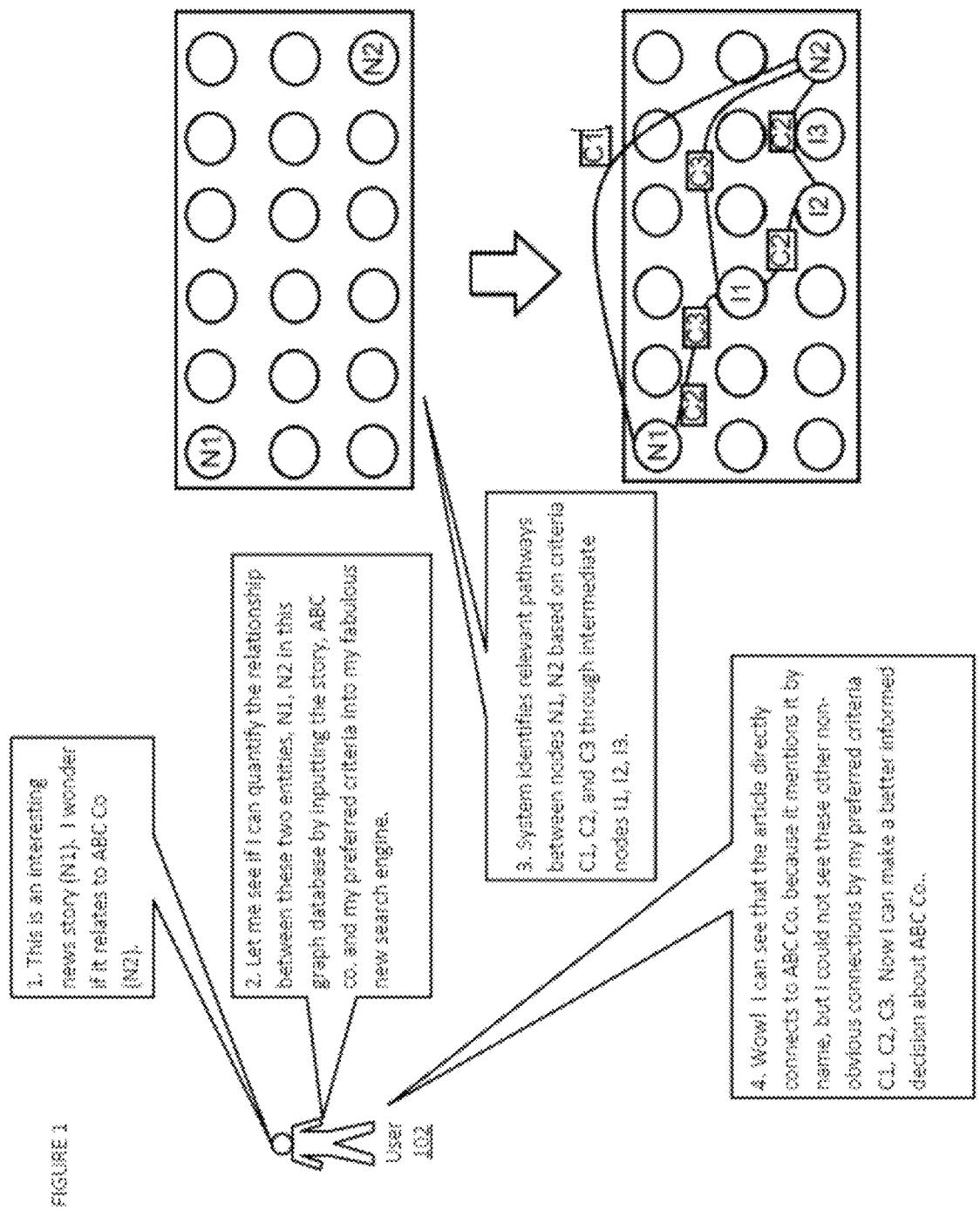
FIG. 1 shows an exemplary usage scenario of a database in one embodiment of a system in accordance with the disclosure.

For purposes of illustration, and not limitation, FIG. 1 shows an exemplary usage scenario of a database in one embodiment of a system in accordance with the disclosure. In FIG. 1, a user 102 may utilize an embodiment of the disclosed system to analyze, and quantify, the relevance of a first element, such as a news story N1 with respect to a second element, such as a company N2 (e.g., a publicly-traded corporation). The user may input the news story and the company, which are associated with nodes N1, N2 in a graph database, such as a graph database, relational database, or other database structured to recognize relations between the entities and the company, into a system provided in accordance with the disclosure. The user may then specify desired criteria C1, C2, C3 that could be used to link the news story to the corporation, such as whether a company referenced in the news article is related to the company, whether a person mentioned in the article is or was associated with the company, among many other possible criteria. When actuated based on these inputs, the system then analyzes the relevance of the news article with respect to the company based on the criteria, and then may show a graphic that quantifies the relevance of the news story with respect to the company, evidencing direct, and more attenuated, or hidden, relevancies.

As another illustration, the graph database, or perhaps an additional database structured to recognize relations between various companies, may interact with the graph database to identify each of the suppliers and/or customers of a company, the relative importance of each of those companies, and an impact that may be associated with the news story N1. For instance, the news story, N1, which identifies Company XYZ, is linked with ABC Co. as discussed. Company XYZ may be a customer of ABC Co (e.g., N2 in FIG. 1), or Company XYZ may be a supplier to ABC Co. Additional customers and/or suppliers may be associated with ABC Co (e.g., N2), and the relative importance of each customer and/or supplier may be determined. In such a manner, aspects of the present disclosure allow user 102 to identify that news story N1 relates to ABC Co., and also to determine how important the company or companies associated with the news story N1 are to ABC Co. and therefore determine a relative impact to ABC Co. from the news story N1.

An illustrative example of one implementation in accordance with the disclosure is provided in FIGS. 2A-2G.

FIG. 2A illustrates an example entity ranking in accordance with the disclosure. The entity ranking illustrated in FIG. 2A may be used to generate a display, such as illustrated in FIG. 2B, provided to a user of the system described herein. The particular example illustrated in FIG. 2A displays a ranking of entities in the supply chain of Constellium, an aluminum manufacturing company. The relative importance of each of the entities (e.g., customers or suppliers of Constellium, in the illustrated example) may be determined by a processor circuit programmed to access data written to at least one database, and determine a variety of scores using the accessed data. For instance, referring to FIG. 2A, the relative importance of each of the entities 101 in the supply chain for Constellium may be determined via at least one processor circuit. In this example, the processor circuit or processor circuits determine for each of the entities 101, a supplier revenue fraction 107, an industry revenue exposure 103, and a relative buying power 105. The relative buying power 105 for each entity is determined as compared to other entities in a same industry as the respective entity. As such, the relative buying power for Ball Corp, operating in the containers & packaging industry, is determined as compared to Crown Holdings Inc, and Rexam Ltd., also operating in the containers & packaging industry. Similarly, the relative buying power for Airbus SAS is determined as compared to Boeing Co., also operating in the aerospace & defense industry.

FIG. 2A illustrates the relative buying power 105 of each of the entities 101 as a capital expenditure (e.g, capex_score) for the respective entity. The relative buying power (capital expenditure) for Ball Corp is determined to be 1.122222, whereas the relative buying power (capital expenditure) for Crown Holdings is determined to be 0.875926. In this example, the relative buying power of each entity (e.g., supplier or customer, as the case may be) is determined as a function of a capital expenditure for the entity relative to an industry average capital expenditure. Examples are not so limited, however, and the relative buying power may be determined in additional ways. For instance, the relative buying power of each entity may be determined as a function of an operational expenditure for the entity relative to an industry average operational expenditure. As another illustration, the relative buying power of each entity may be determined as a function of a research and development cost for the entity relative to an industry average research and development cost. For instance, the relative buying power for each of the entities listed in column 101 may be determined as a function of relevant expenses (including but not limited to, capital expenditure, operational expenditure, and research and development costs) for the entity relative to an industry average of those relevant expenses.

In the example illustrated in FIG. 2A, the relative buying power 105 for each entity is determined by capital expenditure scores. In accordance with such examples, the capital expenditure score can be calculated using the following equation, for example:

$$\text{Capex Score} = [\text{Individual Entity Capex}]/[\text{Industry Capex Average}] \quad (1)$$

where the individual entity capex represents the most recently reported annual capital expenditures for each entity. Such annual capital expenditures may be retrieved from a database of financial reports. The database of financial reports may be a publicly available database and/or a privately held database of financial reports. The industry capex average represents the industry average for annual capital expenditures, which may also be retrieved from a publicly available database and/or a privately held database of financial reports.

The supplier revenue fraction 107 indicates for each entity, how many other entities could contend with the entity for the fraction of relative buying power. For example, for each entity 101 (e.g., Ball Corp., Crown Holdings Inc., Daimler AG, etc.) all other entities who compete with the respective entity for market share are identified, and ranked based on estimated revenue share. For each entity, the estimated revenue share is determined based on a fixed competitor rank as follows:

TABLE 1

Fixed competitor ranks and associated estimated revenue share

| Rank | 0 | 1 | 2 | 3 | 4 | 5 | 6 | 7 | 8 |
|---|---|---|---|---|---|---|---|---|---|
| Share | 1 | 1 | 0.9 | 0.8 | 0.7 | 0.5 | 0.4 | 0.3 | 0.2 |

In the above table, the first ranked competitor would have an estimated revenue share of 1, the second ranked competitor would have an estimated revenue share of 0.9 and so forth. Again referring to FIG. 2A, for each of the entities (e.g., suppliers) listed in column 101, competitors for the respective entity are identified, and the estimated revenue fraction is determined for the entity and each respective competitor. Using the estimated revenue fraction for each respective competitor and the entity, the supplier fraction may be determined for the respective entity. That is, Ball Corp. is determined to have a supplier revenue fraction of 1.0 when compared with competitors of Ball Corp. Airbus SAS is determined to have a supplier revenue fraction of 0.555556 when compared with competitors of Airbus SAS, and so forth.

The industry revenue exposure 103 may also be determined for each respective entity within a supply chain. The industry revenue exposure measures how much of an entities' revenue depends on each industry. An entity's revenue breakdown may be given in terms of their own internal business segments rather than the industry of their customers. To determine the industry revenue exposure 103 for each of the respective entities 101, the each entity may be mapped to the business segments (e.g., industries) which it server, and a total revenue exposure may be calculated for each industry. Using Constellium as an example, financial data may be obtained from a publicly available or privately hosted database indicating that Constellium reports revenue for three business segments: automotive structures & industry; packaging & automotive rolled products; and aerospace & transportation. Using these business segments, the relative importance of each industry may be determined. Referring again to FIG. 2A, Ball Corp. may report earnings in a number of industries, one of which is containers & packaging. Based on the amount of revenue Ball Corp. receives from the additional industries, the industry revenue exposure for Ball Corp in the containers & packaging industry may be calculated to be 0.520200. Once the relative buying power (e.g., cap ex score) 105, the supplier revenue fraction 107, and the industry revenue exposure 103 is determined for each of the respective entities 101, then a relative importance score 109 may be determined for each respective entity. The relative importance score is calculated as a function of the determined buying power, the supplier fraction, and the industry revenue exposure. As illustrated, in FIG. 2A, the relative importance of each of the entities 101 to Constellium is determined. The relative importance score for Ball Corp. is determined to be 0.583780, the relative importance score for Crown Holdings Inc. is determined to be 0.455657, the relative importance score for Daimler AG is determined to be 0.441822, and so forth.

FIG. 2B illustrates an example graphical user interface (GUI) displaying the relative importance of suppliers and customers for a particular company. As illustrated, the graphical user interface may display in one portion of the display 111, the name of the company and other factors associated with the company, such as the industry, etc. The GUI may display in a second portion of the display 113, the relative ranking of each of the customers or suppliers. As illustrated in FIG. 2B, each of the suppliers or customers may be color coded according to relative importance scores. For example, Ball Corp. may be displayed in light green, indicating a relatively high level of importance, with each subsequent supplier color changing color to illustrate a decrease in relative importance. Boeing Co may be displayed as black, being of intermediate importance relative to the other suppliers or customers. Peugeot may be displayed in bright red, illustrating the lowest relative score of the suppliers or customers.

Also, each of the respective scores may be color coded on the GUI to illustrate the relative ranking of the sub-scores calculated. For example, while Boeing is illustrated as having a medium level of importance, the industry revenue exposure score may be displayed a shade of red, indicating a low industry revenue exposure score relative to the other suppliers or customers. In the example illustrated, about 30% of Constellium's revenue is exposed to the aerospace industry, and therefore it is of relatively low exposure. Conversely, the capex score for Boeing is relatively high as compared to the other suppliers or customers, and may be displayed in a light green color. Moreover, the competitive supplier fraction for Boeing is determined to be lower than the other suppliers or customers, and may be displayed in a darker red shade to evidence the relatively low the competitive supplier fraction for Boeing. Accordingly, each of the respective boxes may be shaded to indicate different relative scores compared between the other suppliers or customers.

The GUI display illustrated in FIG. 2B includes information about the supply chain of Constellium. From the displayed information, users may obtain additional information allowing them to more accurately ascertain the impact of a news article or other piece of intelligence on the company. Using the previous example as an illustration, a user may wish to know how much of an impact news of Delta airlines cancelling an order for 18 Boeing 787 Dreamliner aircrafts, has on Constellium (an aluminum manufacturer which supplies materials to Boeing). In this example, the generated display provides up-to-date information using market reports and industry segment data to determine that Boeing is a medium important customer to Constellium. Therefore, the news of Delta cancelling orders for 18 Boeing 787 Dreamliner aircrafts will impact Constellium, a supplier to Boeing, in a mid-range as compared to other customers of Constellium. As illustrated, Boeing is determined to be of medium importance to Constellium based on its overall score. Furthermore, the supporting columns illustrate a few key facts about Constellium's supplier relationship with Boeing. The 'Industry Revenue Exposure' indicates that up to 30% of Constellium's revenue is exposed to Aerospace companies, which is shared with only one other company (Airbus). The capex score indicates that Boeing has an average buying power among Aerospace companies. Furthermore, the display indicates that about 60% of Boeing's expenses for aluminum sheets go to Constellium competitors. Based on this, the user (e.g., a portfolio manager) can decide whether the medium revenue dependency is cause for action in light of the Delta news.

Figure 2C:
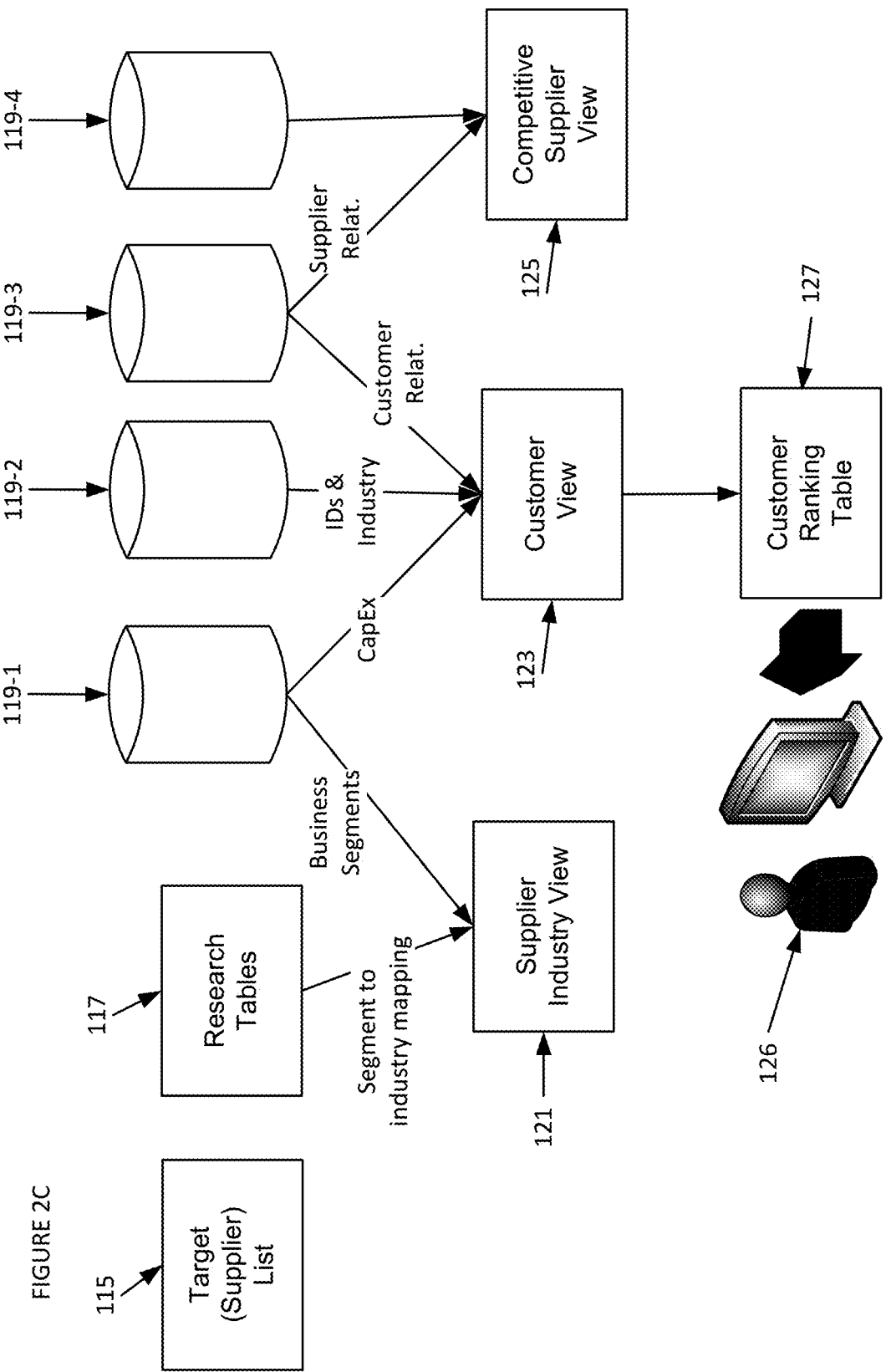
FIG. 2C shows an example process flow for generating a graphical user interface displaying relative importance of entities in a supply chain in accordance with the disclosure.

FIG. 2C shows a process flow for generating a graphical user interface displaying relative importance of entities in a supply chain in accordance with the disclosure. As discussed herein, information from at least one database (e.g., databases 119-1, 119-2, 119-3, and 119-4, collectively referred to herein as databases 119) structured to recognize relations between the entities and the company may be used to determine relative importance of the entities to the company. At 115, a user may input, such as via an apparatus comprising a memory and a processor in communication with memory, a target supplier list which includes the list of entities comprising a supply chain of a company. The user may also input, via the apparatus, research tables 117 which include a mapping of industry segments that each entity is exposed to. Responsive to receipt of the list of entities and research tables, instructions may be executed to retrieve from the databases 119, information regarding competitive suppliers of each of the plurality of entities, revenue information for each of the plurality of entities, and industry segment information for each of the plurality of entities. For example, the user device may receive from database 119-1, information on business segments for each respective entity in the supply chain, as well as capital expenditures for each respective entity. The user device may receive from database 119-2, information about each respective entity including identifiers and industry classification, and from database 119-3, information related to customer relationships and supplier relationships. Yet further, the user device may receive from database 119-4, information about competitors of each respective entity. As such, the user device may receive from the databases 119, information regarding competitive suppliers of each of the plurality of entities, revenue information for each of the plurality of entities, and industry segment information for each of the plurality of entities. Using the information received, the user device (e.g., the apparatus including memory and a processor in communication with the memory), may determine for each entity, a relative buying power, a supplier revenue fraction, and an industry revenue exposure as discussed herein. Responsive to determining each of the respective sub-scores (e.g., the relative buying power, the supplier revenue fraction, and the industry revenue exposure), the relative importance score for each respective entity in the supply chain may be determined.

As illustrated in the process flow of FIG. 2C, a plurality of displays may be generated. For example, the user device may generate for display on a graphical user interface, a first display 125 including a list of competitors of each of the plurality of entities in the supply chain (e.g., a competitive supplier view). The competitive supplier view may display the relative supplier revenue fractions for each respective entity. The user device may generate a second display 123 including a list of the industries of each of the plurality of entities in the supply chain (e.g., a customer view). The customer view may display information related to the capital expenditure for each entity, as well as the average capital expenditure for each entity. The user device may generate a third display 121 including information on industry segments to which the entity is exposed (e.g., a segment to industry mapping view). Each of the different displays 121, 123 and 125 may be separate, independent displays on a graphical user interface. From the displays 121, 123, and 125, a fourth display 127, including the relative importance score for each respective entity may be provided on the user interface. An example of such display is provided in FIG. 2B. As discussed and illustrated with regards to FIG. 2B, the display may include the relative importance score for each respective entity in the supply chain, where each of the entities is color coded to illustrate a respective importance with regard to the other entities in the supply chain.

FIG. 2D illustrates an example competitive supplier view for a company, used to generate a relative importance of entities in a supply chain in accordance with the disclosure. As discussed herein, the competitive supplier view includes supplier revenue fraction information for each respective entity. To compute the scores and the respective ranking for each entity, a list of customers for each supplier may be created using data retrieved from a database (e.g., at least one of databases 119) and relevant metadata may be collected from the databases, such as identifiers, industry classification, and relationship confidence, among other data.

Responsive to creation of the entity ranking, the relative buying power for each entity may be determined, as discussed herein. The relative buying power may be determined using capital expenditure relative to an industry average capital expenditure. The calculated capital expenditure provides an indication of the relative buying power of the entity in relation to other entities.

In accordance with such example embodiments, the supplier revenue fraction is also determined. The customer buying power measures how many other suppliers would contend for the fraction of the entities' buying power. For each customer all other suppliers who are competitors to the supplier entity may be determined, and revenue share may be estimated based on a fixed competitor rank as described herein. Once the supplier revenue fraction for each entity is determined, the display illustrated in FIG. 2D may is generated.

FIGS. 2E-2F illustrate example screen shot diagrams illustrating a further aspect of the embodiment of FIG. 2D. Once the relative buying power for each entity is determined, and the supplier revenue fraction for each entity is determined, an industry revenue exposure for each entity may be determined. Measuring industry revenue exposure allows for the estimation of how much of an entities' revenue depends on each industry. An entities' revenue breakdown is generally given in terms of their own internal business segments rather than the industry of their customers. As illustrated in FIG. 2E, the various business/industry segments which each entity is engaged may be determined, and the relative revenue for each industry segment may be determined. For example, for each entity which is in the supply chain for Constellium, the information displayed in FIG. 2E may be determined, including the segment name, segment revenue, and segment revenue percentage for each respective entity. Next, the industry revenue importance scores for each respective entity may be determined, as illustrated in FIG. 2F. From the industry revenue importance scores illustrated in FIG. 2F, the industry revenue exposure scores may be determined as illustrated in FIG. 2G. These industry revenue exposure scores indicate the relative exposure for the particular entity in each of the identified industries, and are subsequently used to determine the relative importance score for each respective entity.

The illustrative algorithm and computerized processes described herein provide the user with a relative ranking of customers rather than an accurate estimate of percentage of revenue exposed to each of the customers. If an accurate estimate of percentage of revenue exposed to each of the customers is required, a similar approach may be followed, which includes first computing the revenue exposure for each industry bucket (based on a business activity mapping) and then splitting the revenue within the bucket proportional to (Capex*Supplier Fraction).

Figure 3:
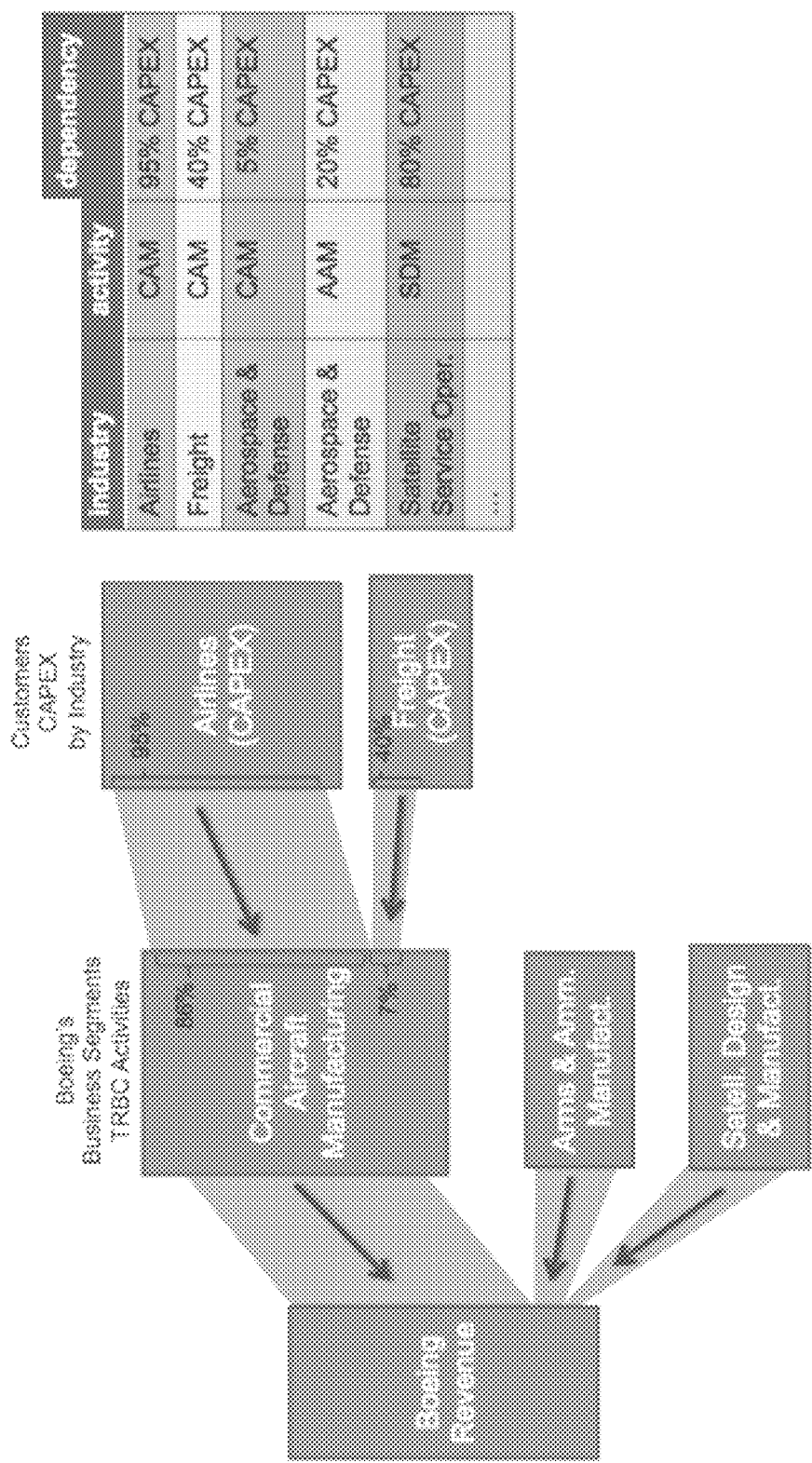
FIG. 3 illustrates an additional embodiment for determining industry revenue exposure in one embodiment of the present disclosure.
Figure 4:
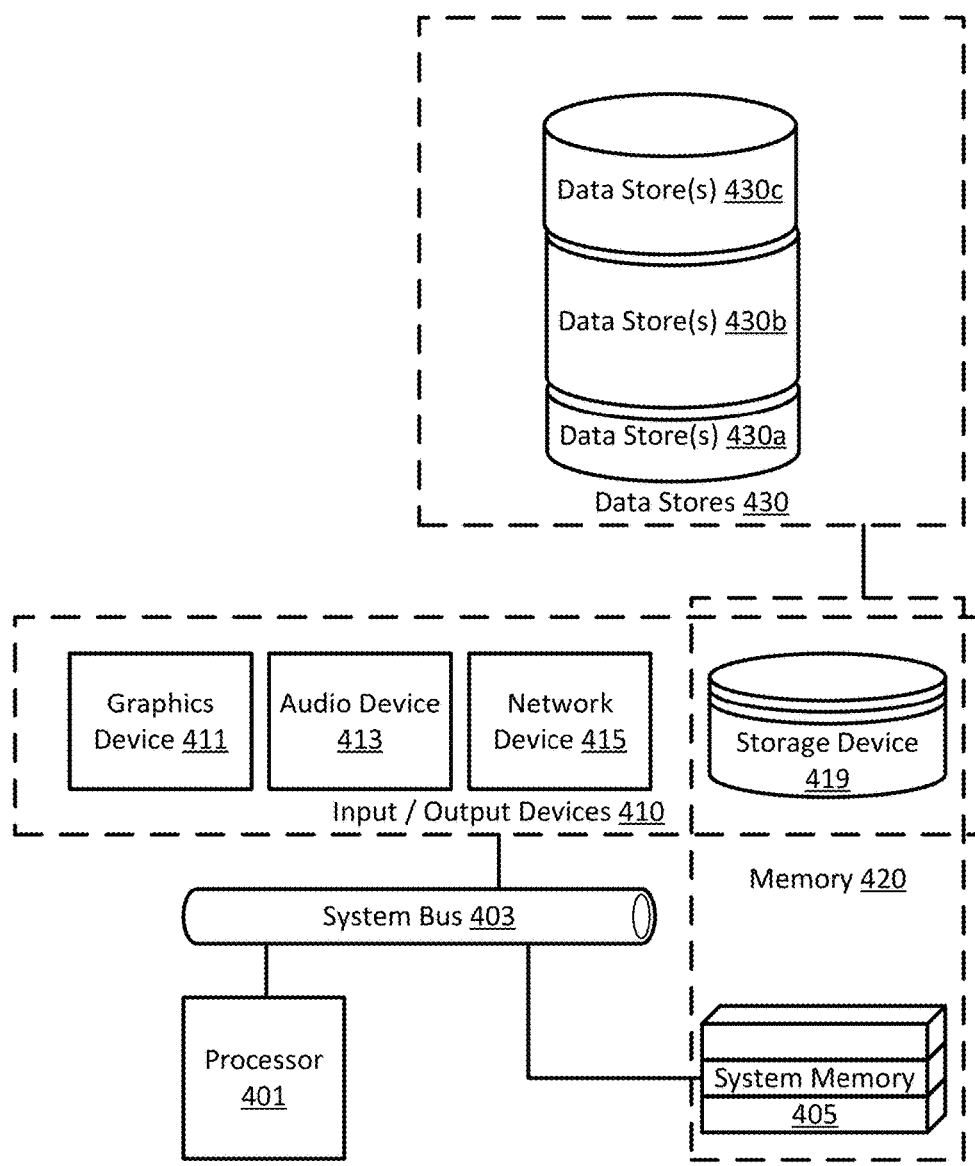
FIG. 4 shows a block diagram illustrating an exemplary system coordinator in one embodiment of the disclosure.

FIG. 3 illustrates an additional embodiment for determining industry revenue exposure in one embodiment of the present disclosure. Instead of using the business segment information for each entity in a supply chain as described above, examples of the present disclosure include use of a general importance mapping between industry, business activities, and dependency. For instance, any entity that generates revenue through "Commercial Aircraft Manufacturing", may be assumed to be highly dependent on "Airlines" and slightly dependent on "Air Freight" and "Comm. Leasing" companies for this activity. A table like shown in the top right of FIG. 3 may be used accordingly. This provides scalable approach that maps general activity to industry (or activity) independent of the specific supplier segment FIG. 4 shows a block diagram illustrating an exemplary system coordinator in one embodiment of the disclosure. The system coordinator, such as may be implemented on a client (e.g. user) device, such as user device 126 illustrated in FIG. 2C. The system coordinator facilitates the determination of relative importance of entities within a supply chain via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the system coordinator may receive, obtain, aggregate, process, generate, store, retrieve, send, delete, input, output, and/or the like data (including program data and program instructions); may execute program instructions; and may communicate with computer systems, nodes, users, and/or the like. In various embodiments, the system coordinator may comprise a standalone computer system, a distributed computer system, a node in a computer network (i.e., a network of computer systems organized in a topology), a network of system coordinators, and/or the like. It is to be understood that the system coordinator and/or the various system coordinator elements (e.g., processor, system bus, memory, input/output devices) may be organized in any number of ways (i.e., using any number and configuration of computer systems, computer networks, nodes, system coordinator elements, and/or the like) to generate a relative importance of entities in a supply chain in accordance with the disclosure. Furthermore, it is to be understood that the various coordinator computer systems, coordinator computer networks, coordinator nodes, coordinator elements, and/or the like may communicate among each other in any number of ways to facilitate system operation. As used in this disclosure, the term "administrator" or "user" refers generally to people and/or computer systems that interact with the system; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The system coordinator includes a processor 401 that executes program instructions (e.g., system program instructions). The processor may be implemented using integrated circuits (ICs), application-specific integrated circuits (ASICs), field-programmable gate arrays (FPGAs), and/or the like. The processor may be connected to system memory 405 via a system bus 403. The system bus may interconnect these and/or other elements of the system coordinator via electrical, electronic, optical, wireless, and/or the like communication links. In various embodiments, the system bus may comprise one or more control buses, address buses, data buses, memory buses, peripheral buses, and/or the like. The processor may access, read from, write to, store in, erase, modify, and/or the like, the system memory in accordance with program instructions executed by the processor. The system memory may facilitate accessing, storing, retrieving, modifying, deleting, and/or the like data by the processor.

In various embodiments, input/output devices 410 may be connected to the processor and/or to the system memory, and/or to one another via the system bus. In some embodiments, the input/output devices may include one or more graphics devices 411. The processor may make use of the one or more graphic devices in accordance with program instructions (e.g., system program instructions) executed by the processor. The graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 413. The processor may make use of the one or more audio devices in accordance with program instructions (e.g., system program instructions) executed by the processor. In one implementation, an audio device may be a sound card that may obtain (e.g., via a connected microphone), process, output (e.g., via connected speakers), and/or the like audio data (e.g., system data). The audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 415. The processor may make use of the one or more network devices in accordance with program instructions (e.g., system program instructions) executed by the processor. In one implementation, a network device may be a network card that may obtain, process, output, and/or the like network data (e.g., system data). The network device may be discreet, external, embedded, integrated into a motherboard, and/or the like. The network device may operate in combination with other network devices (e.g., in parallel) to provide improved data throughput, redundancy, and/or the like. In some embodiments, the input/output devices may include one or more storage devices 419. The processor may access, read from, write to, store in, erase, modify, and/or the like a storage device in accordance with program instructions (e.g., system program instructions) executed by the processor. A storage device may facilitate accessing, storing, retrieving, modifying, deleting, and/or the like data (e.g., system data) by the processor. In one implementation, the processor may access data from the storage device directly via the system bus. In another implementation, the processor may access data from the storage device by instructing the storage device to transfer the data to the system memory and accessing the data from the system memory.

The storage device 419 may be discreet, external, embedded, integrated (e.g., into a motherboard, into another storage device), and/or the like. A storage device 419 may operate in combination with other storage devices to provide improved capacity, data throughput, data redundancy, and/or the like. Together and/or separately the system memory 405 and the one or more storage devices 419 may be referred to as memory 420 (i.e., physical memory).

System memory 420 contains processor-operable (e.g., accessible) system data stores 430. Data stores 430 comprise data that may be used (e.g., by the system) via the system coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Data stores 430 may comprise a non-transitory machine readable medium storing instructions executable by processor 401 to perform a specified function. Accordingly, each of the respective data stores 430a-430c include programmatic instructions which, when executed by processor 701, provide for determination of a relative importance score for each respective entity in the supply chain in accordance with the present disclosure. For example, data stores 430a-430c may include instructions executable by processor 401 to retrieve from at least one database structured to recognize relations between the entities and the company, information regarding competitive suppliers of each of the plurality of entities, revenue information for each of the plurality of entities, and industry segment information for each of the plurality of entities. As another illustration, data stores 430a-430c may include instructions executable by processor 401 to determine, for each respective entity in the supply chain and using the received database information, a relative buying power, a supplier revenue fraction, and an industry revenue exposure. Data stores 430a-430c may also include instructions executable by processor 401 to compute a relative importance score for each respective entity in the supply chain, as a function of the determined buying power, supplier fraction, and industry revenue exposure for the respective entity.

Data stores 430a-430c may also include instructions executable by processor 401 to generate for display on a graphical user interface a first display including a list of competitors of each of the plurality of entities in the supply chain, and a second display including a list of the industries of each of the plurality of entities in the supply chain. The data stores 430a-430c may also include instructions executable by processor 401 to generate for display on a graphical user interface a third display including a supplier industry activity display including information on industry segments to which the entity is exposed, and a fourth display including the relative importance score for each respective entity in the supply chain. In some examples, the data stores 430a-430c include instructions executable by processor 401 to receive as data input, a list of the entities in a supply chain for the company, and retrieve the competitive supplier information, revenue information, and industry segment information responsive to the received data input. In some examples, the data stores 430a-430c include instructions executable by processor 401 to retrieve from at least one database structured to recognize relations between the entities and the company, information regarding competitive suppliers of each of the plurality of entities, revenue information for each of the plurality of entities, and industry segment information for each of the plurality of entities. In some examples, the data stores 430a-430c include instructions executable by processor 401 to generate a display including the relative importance score for each respective entity in the supply chain, wherein each of the entities is color coded to illustrate a respective importance with regard to the other entities in the supply chain.

Data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, system coordinator elements, and/or the like) to facilitate system operation. For example, system data stores may comprise data stores 430a-c implemented as one or more databases.

Figure 5:
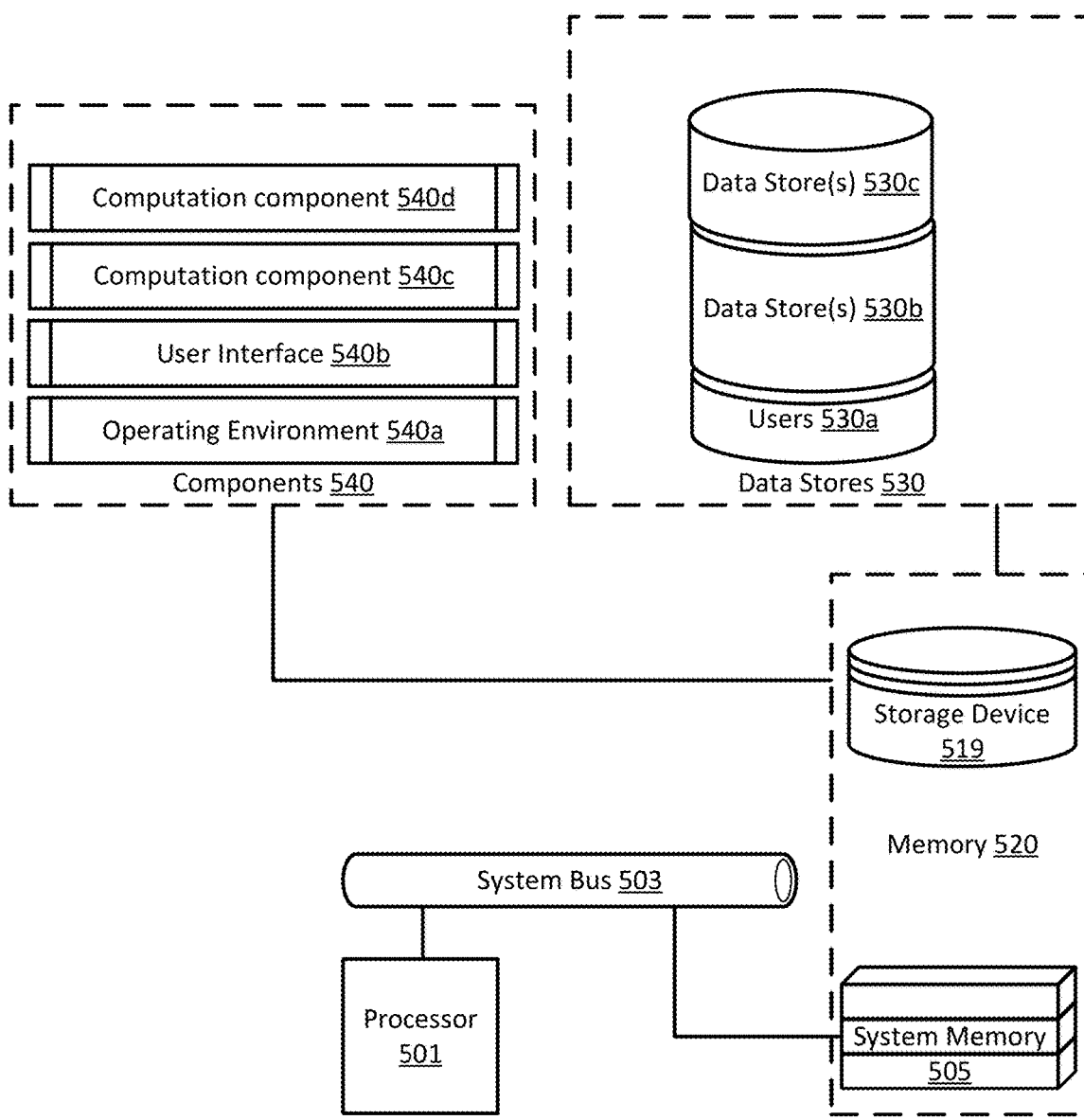
FIG. 5 shows a block diagram illustrating an exemplary system coordinator in one embodiment of the disclosure.

FIG. 5 shows a block diagram illustrating an exemplary system coordinator in one embodiment of the disclosure. The system coordinator, such as may be implemented by a service provider providing the value chain analytics functions described herein to commercial customers. In various embodiments, the system coordinator may comprise a stand-alone computer system, a distributed computer system, a node in a computer network (i.e., a network of computer systems organized in a topology), a network of system coordinators, and/or the like. It is to be understood that the system coordinator and/or the various system coordinator elements (e.g., processor, system bus, memory, input/output devices) may be organized in any number of ways (i.e., using any number and configuration of computer systems, computer networks, nodes, system coordinator elements, and/or the like) to facilitate valuation of a supply chain as described herein.

The system coordinator includes a processor 501 that executes program instructions (e.g., system program instructions). The processor may be implemented using integrated circuits (ICs), application-specific integrated circuits (ASICs), field-programmable gate arrays (FPGAs), and/or the like. The processor may be connected to system memory 505 via a system bus 503. The system bus may interconnect these and/or other elements of the system coordinator via electrical, electronic, optical, wireless, and/or the like communication links. The system memory 505, in various embodiments, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/or the like. The system memory may be discreet, external, embedded, integrated into a CPU, and/or the like. The processor may access, read from, write to, store in, erase, modify, and/or the like, the system memory in accordance with program instructions executed by the processor. The system memory may facilitate accessing, storing, retrieving, modifying, deleting, and/or the like data by the processor.

In some embodiments, the processor may access, read from, write to, store in, erase, modify, and/or the like a storage device 519 in accordance with program instructions (e.g., system program instructions) executed by the processor. A storage device may facilitate accessing, storing, retrieving, modifying, deleting, and/or the like data (e.g., system data) by the processor. In one implementation, the processor may access data from the storage device directly via the system bus. In another implementation, the processor may access data from the storage device by instructing the storage device to transfer the data to the system memory and accessing the data from the system memory. Together and/or separately the system memory 505 and the one or more storage devices 519 may be referred to as memory 520 (i.e., physical memory).

System memory 520 contains processor-operable (e.g., accessible) system data stores 530. Data stores 530 comprise data that may be used (e.g., by the system) via the system coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like.

Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, system coordinator elements, and/or the like) to facilitate system operation. For example, system data stores may comprise data stores 530*a-c* implemented as one or more databases.

System memory 520 contains processor-operable (e.g., executable) components 540. Components 540 comprise program components (including program instructions and any associated data stores) that are executed via the system coordinator (i.e., via the processor) to transform retrieved input data relating to a company's supply chain into system outputs identifying the relative importance score of each respective entity in the supply chain. It is to be understood that the various components and their subcomponents, capabilities, applications, and/or the like may be organized in any number of ways (i.e., using any number and configuration of components, subcomponents, capabilities, applications, system coordinator elements, and/or the like) to facilitate system operation. Furthermore, it is to be understood that the various components and their subcomponents, capabilities, applications, and/or the like may communicate among each other in any number of ways to facilitate system operation. For example, the various components and their subcomponents, capabilities, applications, and/or the like may be combined, integrated, consolidated, split up, distributed, and/or the like in any number of ways to facilitate system operation. In another example, a single or multiple instances of the various components and their subcomponents, capabilities, applications, and/or the like may be instantiated on each of a single system coordinator node, across multiple system coordinator nodes, and/or the like.

In some embodiments, components 540 may include an operating environment component 540*a*. The operating environment component may facilitate operation of the system via various subcomponents. In some implementations, the operating environment component 540*a* may include an operating system subcomponent. The operating system subcomponent may provide an abstraction layer that facilitates the use of, communication among, common services for, interaction with, security of, and/or the like of various system coordinator elements, components, data stores, and/or the like.

In some embodiments, the operating system subcomponent may facilitate execution of program instructions (e.g., system program instructions) by the processor by providing process management capabilities. For example, the operating system subcomponent may facilitate the use of multiple processors, the execution of multiple processes, multitasking, and/or the like. In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices. In some embodiments, the operating system subcomponent may facilitate operation of the system coordinator as a node in a computer network by providing support for one or more communications protocols.

In some embodiments, the operating system subcomponent may facilitate user interaction with the system by providing user interface elements that may be used by the system to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. In another implementation, such user interface elements may include sounds (e.g., event notification sounds stored in MP3 file format), animations, vibrations, and/or the like that may be used to inform the user regarding occurrence of various events.

In some implementations, the operating environment component may include a database subcomponent. The database subcomponent may facilitate system capabilities such as storage, analysis, retrieval, access, modification, deletion, aggregation, generation, and/or the like of data (e.g., the use of data stores 530). The database subcomponent may make use of database languages (e.g., Structured Query Language (SQL), XQuery), stored procedures, triggers, APIs, and/or the like to provide these capabilities. In various embodiments, the database subcomponent may comprise a cloud database, a data warehouse, a distributed database, an embedded database, a parallel database, a real-time database, and/or the like.

In some implementations, the operating environment component 540*a* may include an information handling subcomponent. The information handling subcomponent may provide the system with capabilities to serve, deliver, upload, obtain, present, download, and/or the like a variety of information.

In some embodiments, components 540 may include a user interface component 540*b*. The user interface component may facilitate user interaction with the system by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component.

In some embodiments, components 540 may include components, such as computation components 540c-540d capable of computing a relative importance score for each respective entity in a supply chain, as described herein. Although FIG. 5 illustrates two (2) computation components, more or fewer analysis components may be included. Components 540 may comprise a non-transitory machine readable medium storing instructions executable by processor 501 to perform a specified function. Accordingly, each of the respective components 540c-540d include programmatic instructions which, when executed by processor 501, provide for computation of a relative importance score for each respective entity in a supply chain in accordance with the present disclosure.

For example, computation component 540c may include instructions which, when executed by processor 501, cause processor 501 to determine, for each respective entity in a supply chain of a company, a relative buying power of the entity as compared to other entities in a same industry as the respective entity. The computation component 540c may include instructions which, when executed by processor 501, cause processor 501 to determine, for each respective entity in a supply chain of a company, a supplier fraction of the entity as compared to competitors to the respective entity. The computation component 540c may include instructions which, when executed by processor 501, cause processor 501 to determine, for each respective entity in a supply chain of a company an industry revenue exposure for the entity as compared to other industry segments to which the entity is exposed. The computation component 540d may include instructions which, when executed by processor 501, cause processor 501 to compute a relative importance score for each respective entity in the supply chain, as a function of the determined buying power, supplier fraction, and industry revenue exposure for the respective entity.

In some examples, computation components 540c-540d include instructions executable by processor 501 to identify for each respective entity, a plurality of industry segments served by the respective entity, identify a revenue for each of the plurality of industry segments served by the respective entity, and calculate the industry revenue exposure as a function of the identified revenue for each of the plurality of industry segments. In some examples, computation components 540c-540d include instructions executable by processor 501 to generate a display on a graphical user interface including the relative importance score for each respective entity as compared to the other entities in the supply chain. In some examples, computation components 540c-540d include instructions executable by processor 501 to identify for the company, a list of the plurality of entities in the supply chain and metadata linking the plurality of entities, including an industry classification and a relationship confidence, and generate a display on a graphical user interface including the list of the plurality of entities and the metadata linking the plurality of entities. In some examples, computation components 540c-540d include instructions executable by processor 501 to generate a display on a graphical user interface including, for each respective entity in the supply chain, the relative importance score, the determined relative buying power, the determined supplier fraction, and the determined industry revenue exposure.

The entirety of this disclosure (including the written description, figures, claims, abstract, appendices, and/or the like) for SYSTEMS. METHODS AND MACHINE READABLE PROGRAMS FOR VALUE CHAIN ANALYTICS shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure.

Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the system coordinator, system coordinator elements, system data stores, system components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the system coordinator, system coordinator elements, system data stores, system components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure.

Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, non-provisional applications, continuation applications, continuation-in-part applications, divisional applications, and/or the like. It is to be understood that while some embodiments of the system discussed in this disclosure have been directed to monitoring real time electronic trading data systems, the innovations described in this disclosure may be readily applied to a wide variety of other fields and/or applications.

What is claimed is:

1. A graph database computer-implemented method of determining relative importance of a company and a news story that does not explicitly mention the company based on a relationship between the news story and at least one entity in a plurality of entities in a supply chain of the company, wherein each of the company, the news story and the plurality of entities is associated with a discrete node in a graph database, the method comprising:
   receiving a request associated with a company to determine the relevance of a news story with respect to the company via processor, the request identifying the news story, the company, and criteria to link the news story to the at least one entity in a supply chain of the company via processor using the graph database, wherein the news story does not explicitly mention the company;
   responsive to the request, identifying, via processor, a plurality of entities in the supply chain of the company, wherein the company, the news story, and each entity in the plurality of entities is associated with a respective node of a plurality of nodes in the graph database, and wherein each entity in the plurality of entities is identified via processor by identifying connections in the graph database connecting the node corresponding to the company to each said node corresponding to each entity in the plurality of entities;
   identifying at least one connection between the news story and said at least one of the entities in the supply chain of the company via processor based on the criteria;
   retrieving from the graph database, via processor, business information identified during the identifying step regarding the plurality of entities;
   determining the relative importance of each of the plurality of entities within the supply chain via processor by:
      determining, for each respective entity in the plurality of entities, based on the business information obtained during the retrieving step:
         a relative buying power of the entity as compared to other entities in a same industry as the respective entity;
         a supplier revenue fraction of the entity as compared to competitors to the respective entity; and
         an industry revenue exposure for the entity as compared to other industry segments to which the entity is exposed;
      computing, via processor, a relative importance score for each respective entity in the plurality of entities, as a function of the determined buying power, supplier fraction, and industry revenue exposure for the respective entity, the relative importance score being indicative of the relative importance of the respective entity to the company through the connections identified during the identifying step; and
   generating and sending a signal via processor to permit a user to display on a graphical user interface a graphic representation illustrating each respective entity in the plurality of entities and the respective relative importance score for each respective entity in the plurality of entities, and wherein the graphic representation further displays information that illustrates the impact of the news article on the company based on said at least one connection identified between the news story and said at least one of the entities in the supply chain of the company.

2. The computer-implemented method of claim 1, wherein each of the plurality of entities in the supply chain is a customer of the company or a supplier of goods or services to the company.

3. The computer-implemented method of claim 1, wherein the processor is programmed to:
   identify for each of the plurality of entities in the supply chain:
      a plurality of competitors for the entity; and
      an estimated revenue for the entity and each of the plurality of competitors; and
   calculate the supplier revenue fraction for each respective entity as a function of the estimated revenue.

4. An apparatus to determine relative importance of a news story to a company not mentioned by the news story based on a relationship between the news story and at least one entity in a plurality of entities in a supply chain of the company, comprising:
   a memory;
   at least one graph database structured based on relationships between said plurality of entities, the news story, and the company, wherein the news story, the company and each entity in the plurality of entities is associated with a respective node of a plurality of nodes in the graph database; and
   a processor in communication with the memory and the at least one graph database, said processor being configured to determine relative importance of entities in a supply chain of a company, wherein the processor executes instructions to:
   receive a request associated with the company from a user to determine the relevance of a news story that does not explicitly mention the company with respect to the company, the request identifying the news story, the company, and criteria to link the news story to at least one entity in a supply chain of the company;
   responsive to the request, identify via the processor, the plurality of entities in the supply chain of the company, wherein each entity in the plurality of entities is identified by identifying connections in the graph database connecting the node corresponding to the company to each said node corresponding to each entity in the plurality of entities;
   further responsive to the request, identify via the processor at least one connection between the news story and said at least one of the entities in the supply chain of the company based on the criteria provided by the user;
   retrieve from said at least one graph database business information regarding competitive suppliers of each of the plurality of entities, revenue information for each of the plurality of entities, and industry segment information for each of the plurality of entities;
   determine via the processor, for each respective entity in the plurality of entities using the received information from the graph database:
      a relative buying power of the entity as compared to the competitive suppliers;
      a supplier revenue fraction of the entity as compared to the competitive suppliers; and
      an industry revenue exposure for the entity as compared to other industry segments to which the entity is exposed;
   compute via the processor a relative importance score for each respective entity in the supply chain, as a function of the determined buying power, supplier fraction, and industry revenue exposure for the respective entity; and generate and send a signal to the user to permit the user to display a graphic representation illustrating the impact of the news article on the company based on said at least one connection identified between the news story and said at least one of the entities in the supply chain of the company.

5. The apparatus of claim 4, wherein receiving the request associated with the company from the user includes receiving via a web API a request for a graphical user interface to access said relative importance of a plurality of entities in the supply chain of the company, and, responsive to said request, said processor being further configured to execute via a web server coupled to the graph database a web based application to generate for display on the graphical user interface:

a first rendering including a list of competitors of each of the plurality of entities in the supply chain;

a second rendering including a list of the industries of each of the plurality of entities in the supply chain;

a third rendering including a supplier industry activity display including information on industry segments to which the entity is exposed;

a fourth rendering including the relative importance score for each respective entity in the supply chain; and a fifth rendering illustrating the impact of the news article on the company based on said at least one connection identified between the news story and said at least one of the entities in the supply chain of the company.

6. The apparatus of claim 4, wherein the processor is further configured to execute instructions to receive as data input, a list of the entities, and retrieve the competitive supplier information, revenue information, and industry segment information responsive to the received data input.

7. The apparatus of claim 4, wherein the processor is further configured to execute instructions to retrieve from at least one database structured to recognize relations between the entities and the company, information regarding competitive suppliers of each of the plurality of entities, revenue information for each of the plurality of entities, and industry segment information for each of the plurality of entities.

8. The apparatus of claim 4, wherein the processor is further configured to execute instructions to generate a rendering including the relative importance score for each respective entity in the supply chain, wherein each of the entities is color coded to illustrate a respective importance with regard to the other entities in the supply chain.

9. A non-transitory machine readable medium storing instructions executable by a processor to determine relative importance of a news story to a company not mentioned by the news story based on a hidden relationship between the news story and at least one entity in a plurality of entities in a supply chain of a company which, when executed by the processor, cause the processor to:

responsive to a user request associated with the company to determine the relevance of a news story with respect to the company, wherein the news story does not explicitly mention the company, the request identifying the news story, the company, and criteria to link the news story to at least one entity in a supply chain of the company:

identify via processor, the plurality of entities in the supply chain of the company, wherein the news story, the company, and each entity in the plurality of entities is associated with a respective node of a plurality of nodes in a graph database, and wherein each entity in the plurality of entities is identified via said processor by identifying connections in the graph database between the node corresponding to the company and each said node corresponding to each entity in the plurality of entities;

identify via processor at least one connection between the news story and said at least one of the entities in the supply chain of the company based on the criteria provided by the user;

retrieve from the graph database, via processor, business information identified during the identifying step regarding the plurality of entities;

determine the relative importance of each of the plurality of entities within the supply chain via processor by determining, for each respective entity in the plurality of entities:

a relative buying power of the entity as compared to other entities in a same industry as the respective entity;

a supplier fraction of the entity as compared to competitors to the respective entity; and an industry revenue exposure for the entity as compared to other industry segments to which the entity is exposed;

compute a relative importance score for each respective entity in the supply chain, as a function of the determined buying power, supplier fraction, and industry revenue exposure for the respective entity; and generate and send a signal to the user to permit the user to display a graphic representation illustrating the impact of the news article on the company, visually illustrating said at least one connection identified between the news story and said at least one of the entities in the supply chain of the company.

10. The non-transitory machine readable medium of claim 9, wherein each of the plurality of entities in the supply chain is a different respective supplier of goods or services to the company.

11. The non-transitory machine readable medium of claim 9, wherein each of the plurality of entities in the supply chain is a different respective customer of the company.

12. The non-transitory machine readable medium of claim 9, further comprising instructions which, when executed by the processor, cause the processor to:

identify for each respective entity, a plurality of industry segments served by the respective entity;

identify a revenue for each of the plurality of industry segments served by the respective entity; and calculate the industry revenue exposure as a function of the identified revenue for each of the plurality of industry segments.

13. The non-transitory machine readable medium of claim 9, further comprising instructions which, when executed by the processor, cause the processor to:

generate a display on a graphical user interface including the relative importance score for each respective entity as compared to the other entities in the supply chain and indicating the impact of the news article on the company based on the at least one connection identified between the news story and said at least one of the entities in the supply chain of the company.

14. The non-transitory machine readable medium of claim 9, further comprising instructions which, when executed by the processor, cause the processor to:

identify for the company, a list of the plurality of entities in the supply chain and metadata linking the plurality of entities, including an industry classification and a relationship confidence; and generate a display on a graphical user interface including the list of the plurality of entities and the metadata linking the plurality of entities.

15. The non-transitory machine readable medium of claim 9, further comprising instructions which, when executed by the processor, cause the processor to:

generate a display on a graphical user interface including, for each respective entity in the supply chain, the relative importance score, the determined relative buying power, the determined supplier fraction, and the determined industry revenue exposure and indicating the impact of the news article on the company based on the at least one connection identified between the news story and said at least one of the entities in the supply chain of the company.

16. The computer implemented method of claim 1, wherein receiving the request associated with the company from the user includes receiving via a web API a request for a graphical user interface to access said relative importance of a plurality of entities in the supply chain of the company, and wherein the method further includes, responsive to said request, executing via a web server coupled to the graph database, a web based application to generate for display on the graphical user interface:

a first rendering including a list of competitors of each of the plurality of entities in the supply chain;

a second rendering including a list of the industries of each of the plurality of entities in the supply chain;

a third rendering including a supplier industry activity display including information on industry segments to which the entity is exposed;

a fourth rendering including the relative importance score for each respective entity in the supply chain; and a fifth rendering illustrating the impact of the news article on the company based on said at least one connection identified between the news story and said at least one of the entities in the supply chain of the company.

17. The non-transitory machine readable medium of claim 9, further comprising instructions which, when executed by the processor, cause the processor to:

receive via a web API a request for a graphical user interface to access said relative importance of a plurality of entities in the supply chain of the company;

responsive to said request, execute via a web server coupled to the graph database, a web based application to generate for display on the graphical user interface:

a first rendering including a list of competitors of each of the plurality of entities in the supply chain;

a second rendering including a list of the industries of each of the plurality of entities in the supply chain;

a third rendering including a supplier industry activity display including information on industry segments to which the entity is exposed;

a fourth rendering including the relative importance score for each respective entity in the supply chain; and a fifth rendering illustrating the impact of the news article on the company based on said at least one connection identified between the news story and said at least one of the entities in the supply chain of the company.

18. The method of claim 1, wherein the criteria to link the news story to an entity in the supply chain of the company includes whether a company referenced in the news story is related to the company and whether a person mentioned in the news story is or was associated with the company.

19. The method of claim 1, wherein the graphic representation permits the user to quantify the impact of an event described in the news article on operations of the company based on the connection identified between the news article and said at least one of the entities in the supply chain of the company.

* * * * *